Patented Jan. 6, 1925.

1,522,113

UNITED STATES PATENT OFFICE.

ROBERT O. FRIEND, OF CHICAGO, ILLINOIS.

PROCESS FOR TREATING CLAUCONITE OR GREENSAND.

No Drawing.  Application filed January 23, 1924. Serial No. 688,101.

*To all whom it may concern:*

Be it known that I, ROBERT O. FRIEND, a citizen of the United States, residing at Chicago, in the county of Cook and State of Illinois, have invented certain new and useful Improvements in Processes for Treating Glauconite or Greensand, of which the following is a specification.

This invention has for its object to provide a simple, cheap and efficient process for preparing natural base exchange silicates, and particularly glauconite or greensand, for softening water for household and industrial purposes and, further, to so prepare said silicates for such use as to enable it to be revivified by means of common salt-brine.

In a co-pending application of even date herewith, Serial No. 688,100, I have briefly described the reactions whereby glauconite or greensand softens water and is revivified.

The process herein described is intended for the same purposes as that described in the above mentioned application, but differs therefrom in certain particulars whereby a somewhat better product results in so far as discoloration of the treated water is concerned, on the one hand, and as to capacity of the mineral to soften water, on the other.

Expressed in grain-gallons per pound of the mineral, there is a slight advantage in favor of that which is treated by the process hereinafter described.

In explanation of grain-gallons per pound, the example, viz: that one pound of revivified mineral will soften approximately one gallon of water of thirty-grains hardness, or thirty gallons of one grain hardness, will suffice.

The present process consists in first washing the greensand in a substantially five to ten degree Baumé solution of caustic soda at a temperature ranging, preferably, between 150° and 210° Fahr. for about fifteen to twenty minutes, using about one pound of caustic soda per 100 lbs. mineral, and stirring the mass continuously during this period. This treatment may be continued longer without benefit or disadvantage.

The solution may be of a lower temperature than the above mentioned minimum and the duration of treatment increased proportionately, the higher temperatures being preferable.

The mineral is then thoroughly washed with fresh and, preferably, hot water at about the above temperatures, though cold water may be used. The above treatment results in a thorough cleansing to remove all foreign matter, besides apparently having some chemical effect.

Then the mineral is thoroughly washed with a five per cent solution of borax, also preferably at a temperature between 150° and 210° Fahr. the duration of this treatment being not less than fifteen minutes. It may be continued indefinitely without benefit or disadvantage. It is then again thoroughly washed, preferably with hot water; then drained and then immersed for at least two hours in a five per cent. solution of sodium silicate. It is then again washed and thereafter dried at a temperature not exceeding about 250° Fahr. It may then be screened to divide out all particles that will pass through a sixty-mesh screen.

The mineral is now ready for use in any of the well-known types of zeolite water softening apparatus on the market, including also the types illustrated in my copending applications, Serial Nos. 666,610 filed October 4, 1923, and 636,367 filed May 3, 1923.

In practice I have found that the product of the above process possesses advantages over that of the process of the aforesaid companion application in that, following periods of inactivity, i. e., no flow of hard water, the first soft water withdrawn is not so much discolored and, further, that the capacity, in grain-gallons per pound of mineral, is greater.

The amount of borax used approximates three fourths pound per 100 pounds mineral, and this is true also of the sodium silicate. Slight but continuous agitation or stirring of the mineral while being subjected to the actions of the borax and sodium silicate, respectively, is desirable.

I claim as my invention:

1. The process for treating glauconite or greensand for water softening purposes, which consists in first subjecting the mineral to the action of a caustic alkali solution, then washing the same, then subjecting it to the action of a solution of borax, again washing the same, and then subjecting it to the action of a sodium silicate solution, and thereafter again washing the same, none of said solutions being at a temperature exceeding the boiling point of water.

2. The process for treating glauconite or greensand for water softening purposes, which includes first subjecting the same to the action of caustic soda, then to the action of borax, and finally to the action of sodium silicate, all in solution at temperatures not exceeding the boiling point of water.

ROBERT O. FRIEND.